United States Patent [19]
Brewer et al.

[11] Patent Number: 5,613,082
[45] Date of Patent: Mar. 18, 1997

[54] CONTROL OF RECORD MEDIA USING DEVICE ONLY ACCESSIBLE CONTROL AREAS AND DIRECTORY OF MEDIA CONTROL MARKS AND ERROR HISTORY

[75] Inventors: Michael A. Brewer; Alex Chliwnyj; Dale A. Christiansen; James W. Wolf; Will A. Wright, all of Tucson, Ariz.

[73] Assignee: International Business Machines Corporation, Armonk, N.Y.

[21] Appl. No.: 77,478

[22] Filed: Jun. 14, 1993

[51] Int. Cl.⁶ .............................. G06F 9/26; G06F 9/34; G06F 12/00; G06F 12/02
[52] U.S. Cl. ................... 395/404; 395/405; 395/401; 395/427; 360/109; 360/134; 360/135
[58] Field of Search ................................... 395/404, 428, 395/427, 401; 369/18

[56] References Cited

U.S. PATENT DOCUMENTS

| | | | |
|---|---|---|---|
| 4,393,445 | 7/1983 | Milligan et al. | 364/200 |
| 4,429,363 | 1/1984 | Duke et al. | 364/200 |
| 4,575,827 | 3/1986 | Kulakowski et al. | 365/230 |
| 4,746,998 | 5/1988 | Robinson et al. | 360/72.1 |
| 4,924,331 | 5/1990 | Robinson et al. | 360/72.1 |
| 4,939,598 | 7/1990 | Kulakowski et al. | 360/48 |
| 5,129,088 | 7/1992 | Auslander et al. | 395/700 |
| 5,161,299 | 11/1992 | Denison et al. | 29/603 |
| 5,233,591 | 8/1993 | Toshiba | 369/54 |

FOREIGN PATENT DOCUMENTS

| | | | |
|---|---|---|---|
| 0509637 | 3/1992 | European Pat. Off. | G11B 27/28 |

*Primary Examiner*—Jack A. Lane
*Assistant Examiner*—Than V. Nguyen
*Attorney, Agent, or Firm*—M. W. Schecter; D. A. Shifrin; H. F. Somermeyer

[57] ABSTRACT

A data storage system includes a data storage medium, such as a magnetic tape, that has a first control data storing area or drive partition that is addressable only by a peripheral drive mounting the medium and a plurality of other addressable data storing partitions for storing data. A volume table of contents may be stored in one of the addressable partitions. A tachometer measures and indicates physical locations on the storage medium. Each of the partitions have an extent on the storage medium indicated by said physical locations. The control data in the drive partition includes directories of medium control blocks, such as tape marks, defect marks and the like; directory of all addressable partitions including the physical locations at the beginning of each partitions and other medium physical and logical parameter data. A so-called mount-demount medium control block in the drive partition indicates a demount status that shows all data stored in the drive partition is valid. Loading a storage medium into a drive does not mount the drive for recording and reading. First, a copy of the drive partition stored data is copied to a memory in the peripheral drive and the mount-demount medium control block is marked to indicate the storage medium is mounted. Then, the peripheral drive can indicate to an attaching unit that the storage medium is mounted for use in data processing activities.

24 Claims, 5 Drawing Sheets

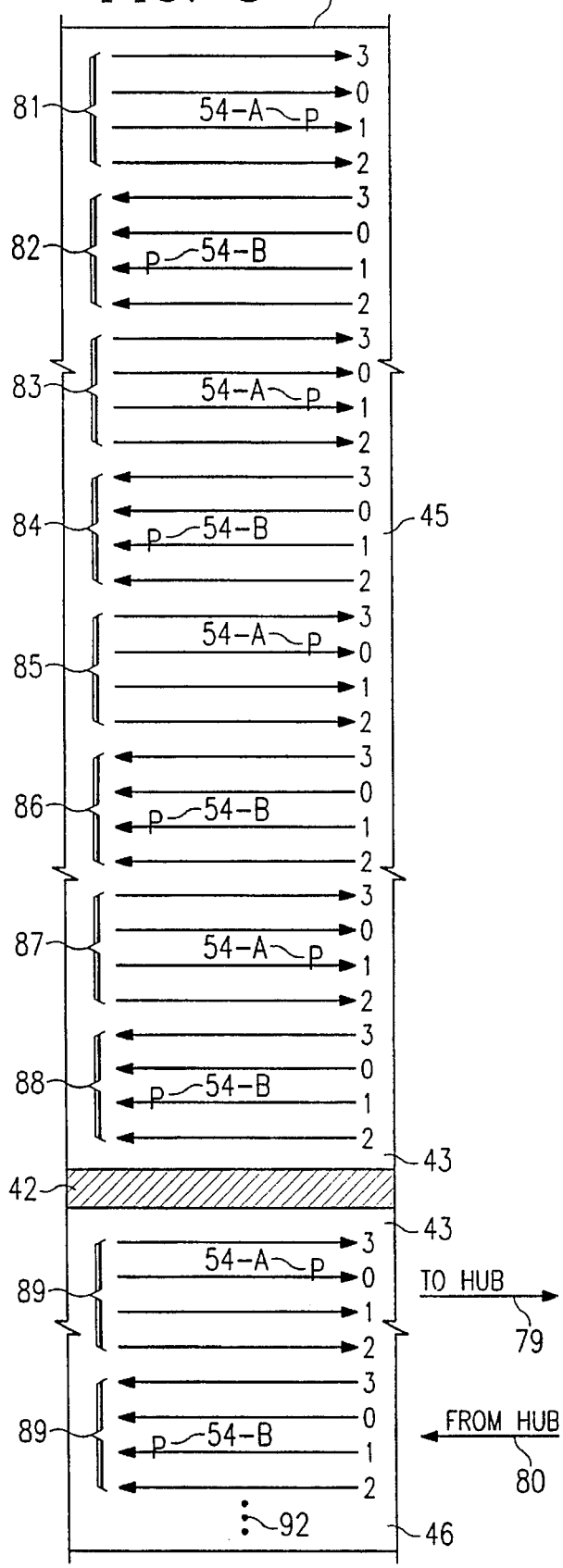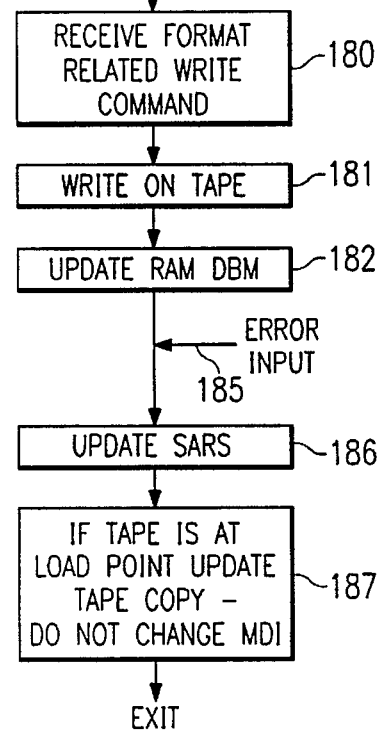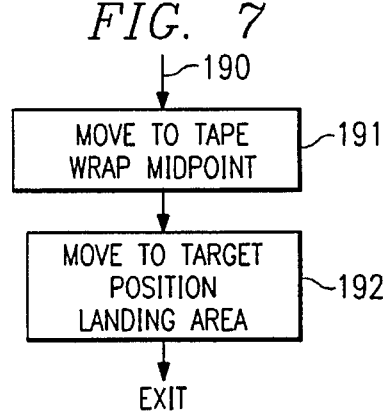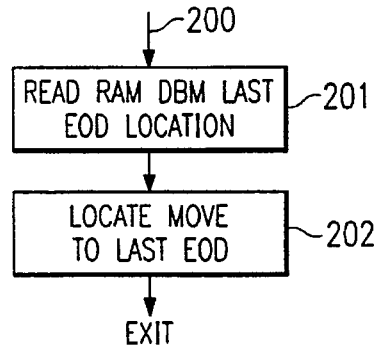

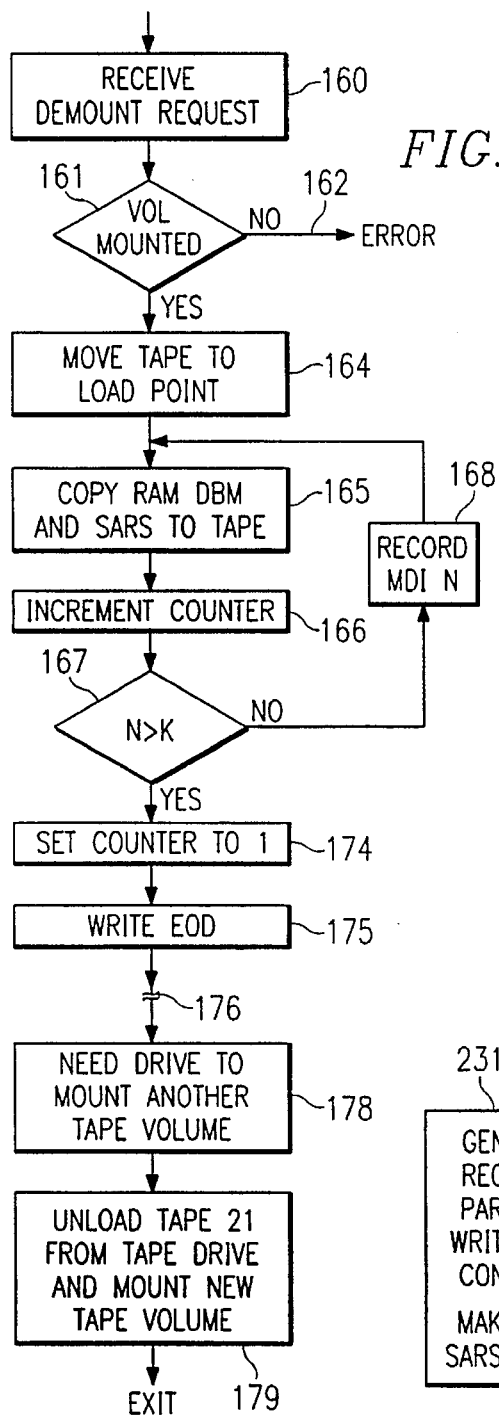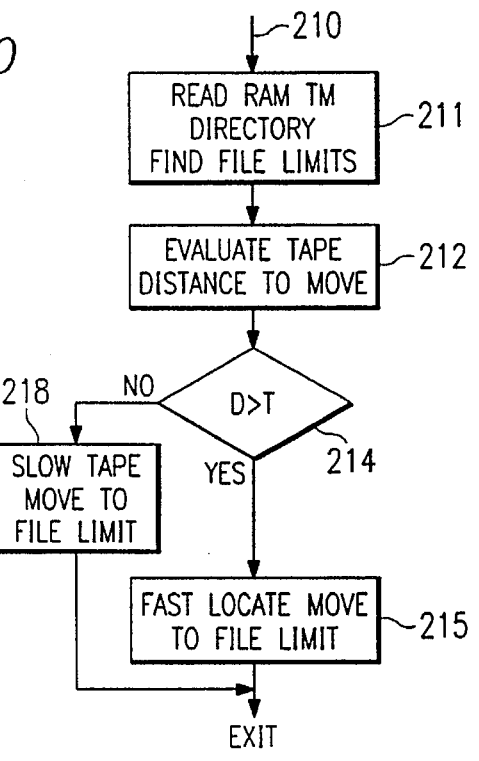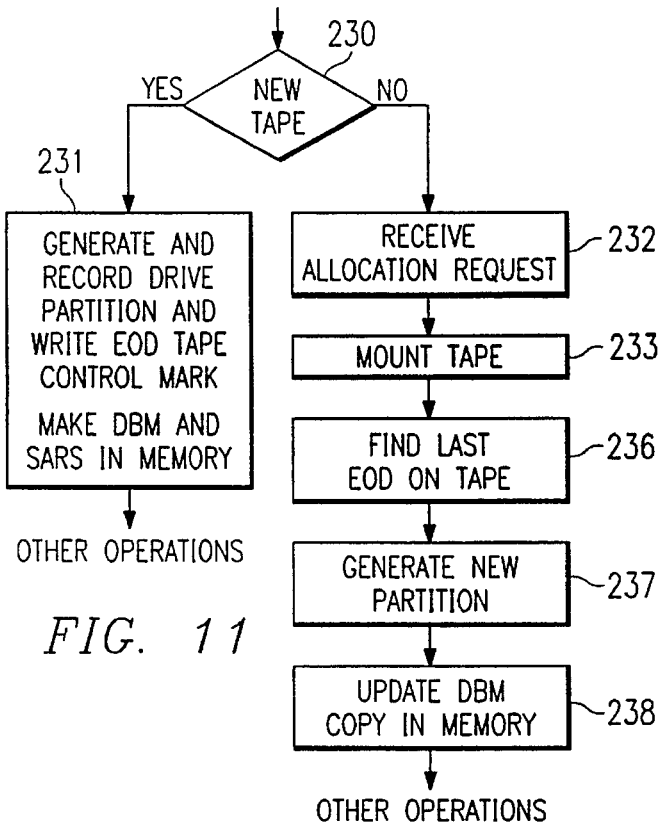

CONTROL OF RECORD MEDIA USING DEVICE ONLY ACCESSIBLE CONTROL AREAS AND DIRECTORY OF MEDIA CONTROL MARKS AND ERROR HISTORY

DOCUMENT INCORPORATED BY REFERENCE

Milligan et al U.S. Pat. No. 4,393,445 is incorporated by reference into this application for patent.

FIELD OF THE INVENTION

This invention relates to data storage devices including control of record media by a device independently of attaching host processors and the like.

BACKGROUND OF THE INVENTION

Prior data storage subsystems required host processor intervention in data storage subsystem operations for performing high speed searches (tape head is not in contact with the tape that is moving faster than tape speed during reading or writing), scanning a record medium (a slow speed search wherein the head is in transducing contact with the tape for reading block ID's, for example), particularly a magnetic tape medium, until a desired logical block is located on the record medium. This situation creates undesired performance problems in those data storage systems employing record media that store an order of magnitude more data than prior art record media. Eliminating or reducing the prior art required host intervention in other aspects of data storage subsystems also increases the efficiency of host processor operations in that attention needed to operate with data storage subsystem operations has been eased.

DISCUSSION OF THE PRIOR ART

The prior art provided a directory in each record media that is created, updated and managed by software in a host processor attached to a data storage subsystem. One representative example of such a directory is shown by Kulakowski et al in U.S. Pat. No. 4,939,598. A volume table of contents (VTOC), another name for a directory recorded on a record medium, for an optical disk file is created, updated and managed by an attaching personal computer, a low performance host processor. Such VTOC included status of addressable data-storage areas on the optical disk data storage medium. Other prior art data storage systems employ similar techniques. Such record medium stored directories typically included addressing capability requiring a host processor to execute software that addresses a medium, rather than allowing a data storage subsystem to address internal data structures of a record medium independently of host processor software. It is desired to remove dependency of addressing internal data structures of a record medium from host processor executed software. An example representative of such addressing directories is shown in Kulakowski et al U.S. Pat. No. 4,575,827. Magnetic tape record media also often included host created, updated and managed records that enabled host processor software to access records stored in a magnetic tape volume. As stated in Kulakowski et al, such control records were termed "tape table of contents", TTOC, rather than VTOC.

Even the addition of so-called "virtual volumes" or "logical volumes" did not remove the requirement for host processor executed software from creating, updating and managing internal data structures of such virtual volumes. Clifton et al in U.S. Pat. No. 4,310,883 shows host processors addressing data in a mass storage system using virtual volumes and virtual devices. While the mass storage subsystem matched the virtual volumes to physical tape volumes, host processor executed software still managed the internal data structures of such virtual volumes. There was no mass storage system created, updated and managed control other than matching the virtual volumes to physical volumes. Clifton et al cite U.S. Pat. No. 3,670,307 as a showing of virtual volume addressing by host processor software using a logical address base.

Duke et al in U.S. Pat. No. 4,429,363 show a cached DASD data-storage subsystem. Content control indica in the Duke et al cache includes what is often referred to as a "written to" bit or a "modified bit". When such a bit (M 66 in Duke et al) is active (usually unity), then the addressable data storage area has been written or modified while when inactive (usually zero) it indicates congruence with a copy stored in the backing store. The purpose of such a written to bit is to avoid copying data from the cache to the backing store if both copies are identical. Duke et al cite U.S. Pat. No. 3,588,839 that teaches that a written to bit is used to control copying data from a front store to a backing store. That is, only that data that is not written to is copied from a front store (cache) to a backing store that is not congruent with the backing store. Duke et al also use the written to bit to avoid promoting or staging data from the backing store to the front store if the copies are congruent. The Duke et al backing store can be considered as an archive for the cache stored data. Therefore, the written to bit also indicates whether or not data are to be archived, such as in a partial archive of data stored in any data storage device.

SUMMARY OF THE INVENTION

The present invention provides a peripheral device (hereinafter drive) addressable area (herein device partition) that is not addressable by host processor software that enables the peripheral drive to create, update and manage directories and other volume-related data structures with respect to data stored in a data storage volume. Such data structures are data block map (hereinafter DBM) that addressably identifies not only host processor addressable data blocks but subsystem data blocks that may or may not be addressable by an attaching host processor. Such DBM enables a peripheral drive to execute high speed locate for rapidly finding a host processor addressable data block or a peripheral drive or drive only addressable data block. Physical medium locations are identified in the DBM. That is a peripheral drive, such as a magnetic tape drive has a reel tachometer indicator that meters magnetic tape displacement for providing tape displacement addressability of a magnetic tape that facilitates high speed searching or locating data blocks. A plurality of reference physical locations or points are established for facilitating high speed (tape movement that is not in contact with a head). Such locations are not identified on the tape, per se, rather are measured and indicated by a suitable tape displacement meter, such as a reel tachometer.

In another aspect of the invention, the status of the DBM and of the physical volume is indicated in the peripheral drive only addressable area. Such status is useful for removable media. The status for a removable medium is either mounted or demounted as indicated in a mount-demount indicator block (MDI). Such status also indicates whether or not the DBM has been logically "checked out" or removed from the record medium, i.e. if a record medium is mounted, then only a drive copy of the DBM is valid. A record medium may be loaded into a peripheral drive but not have a mounted status. Similarly, a fixed medium may not have a mounted status. Mounted status in a peripheral drive requires that a separate copy of the DBM be stored within the peripheral drive that is not on the record medium to which the DBM pertains. Such separate copy may be stored in a RAM. The peripheral drive changing the record medium status from mounted to demounted (whether or not the record medium is to be removed from the peripheral drive) validates the copy(s) in the record medium. Loading a record medium into a peripheral drive having the mount status indicates to the peripheral drive that the DBM is not valid.

A directory of peripheral drive readable "end-of-data" (EOD) data block or tape marks enables high speed locate to the last written EOD that signifies the end of data of a record medium. Other EOD blocks are used to high speed locate to end of data in so-called partitions in a magnetic tape.

Externally identified (viz by a reel tachometer or a magnetic disk tachometer) physical locations identify so-called partitions in a record member. High speed locate access to such partitions is enabled by a directory of such partitions.

A plurality of said DBM's and MDI's are recorded in the drive addressable area. Each DBM copy has an associated MDI copy such that if only one of many copies is valid, a peripheral drive can still employ, update and manage the DBM.

A peripheral drive constructed using the present invention verifies upon a mount request that a loaded record medium has a valid copy of its DBM. The peripheral drive does not respond with a mounted message to a requesting host processor until after a valid copy of DBM is copied into the peripheral drive and all of the MDI's on the record medium are recorded as showing the record medium is mounted.

The foregoing and other objects, features and advantages of the invention will be apparent from the following more particular description of preferred embodiments of the invention, as illustrated in the accompanying drawings.

DESCRIPTION OF THE DRAWING

FIG. 3 is a diagrammatic partial showing of track wraps on the FIG. 2 illustrated magnetic tape format.

FIG. 6 is a simplified flow chart showing peripheral drive operations while the FIG. 2 illustrated magnetic tape is mounted in a peripheral drive.

FIG. 7 is a simplified flow chart showing a high speed locate using the present invention.

FIG. 8 is a simplified flow chart showing a high speed location of last data recorded on the FIG. 2 illustrated magnetic tape or a partition thereof.

FIG. 9 is a simplified flow chart showing selection of a tape motion for accessing an identified data block in the FIG. 2 illustrated magnetic tape or in a partition of the magnetic tape.

FIG. 10 is a simplified flow chart showing demounting a FIG. 2 illustrated tape from the FIG. 1 illustrated data processing system without immediately unloading the magnetic tape from the peripheral drive.

FIG. 11 is a simplified flow chart showing formatting a tape and creating partitions in the FIG. 1 illustrated system.

DETAILED DESCRIPTION

Figure 1:
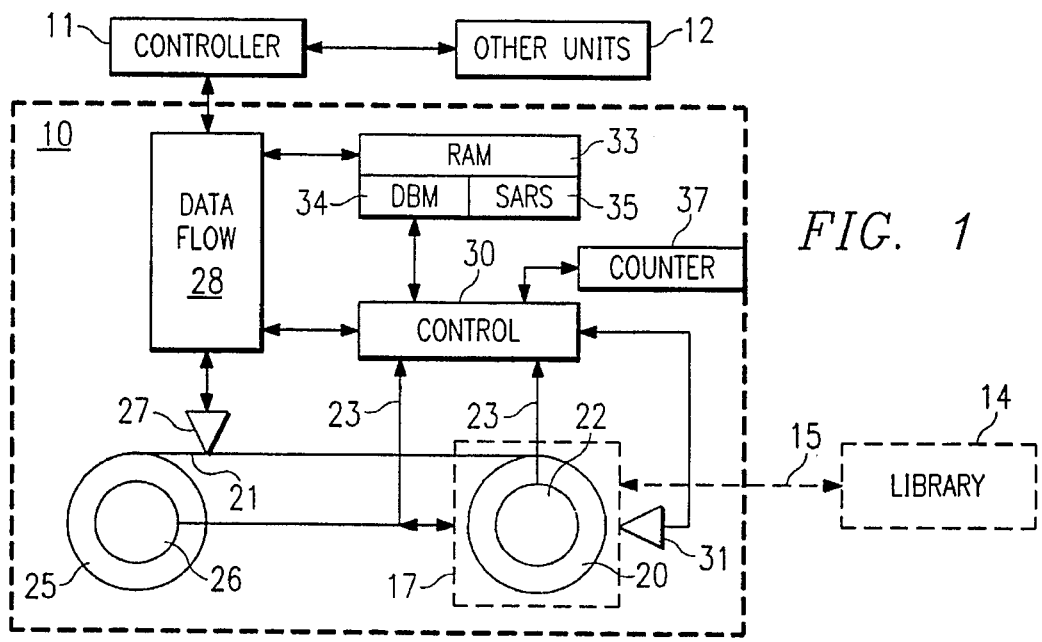
FIG. 1 illustrates in simplified block diagram form a data processing system in which the present invention is employed.

Referring now more particularly to the appended drawing, like numerals indicate like parts and structural features in the various figures. Referring first to FIG. 1, a tape drive 10 is connected (attached) to other units 12 via peripheral controller 11. A direct connection without controller 11 is also contemplated. Other units 12 represent computers of all types, communication systems, local networks and the like. In a constructed embodiment, a tape cartridge 17 containing a single spool 20 of magnetic tape 21 is removably inserted into tape drive 10. Tape cartridge 17 shown in a play position operatively connects a spool motor and tachometer 22 to tape spool 20 for unreeling and reeling tape 21. Tape 21 is automatically threaded (in a known manner) past laterally-positionable multi-track multi-gap head 27 to machine reel 25. Data are transferred between tape 21 and other units 12 via data flow 28. Data flow 28 performs the usual formatting, error detecting and correcting, and other processing of information-bearing signals (data) found in magnetic tape recording apparatus. Motor and tachometer 26 rotate spool 25 in synchronism with spool 20, as is known. Lines 23 denote control and sensing signal transfer between motors 22 and 26 with tape drive control 30. Control 30 includes the usual programmed control for controlling data flow 28 and communicating with other units 12. Cartridge present sensor 31 senses the cartridge 17 for informing control 30 that cartridge 17 has been loaded into tape drive 10. Random access memory (RAM) 33 buffers data for data flow 28, stores control information for control 30 and may store an operating program for programmed control 30. Of course, control 30 may employ a read only memory (ROM) (not shown) for containing its program elements. Of interest to the present invention is the storage of a separate copy of the Data Block Map (DBM) 34 and a separate copy of a statistical analysis recording system (SARS) 35 in RAM 33. These item 34 and 35 are also stored in tape 21 in a portion that is addressable only by peripheral drive 10, as will become more apparent.

Figure 2:
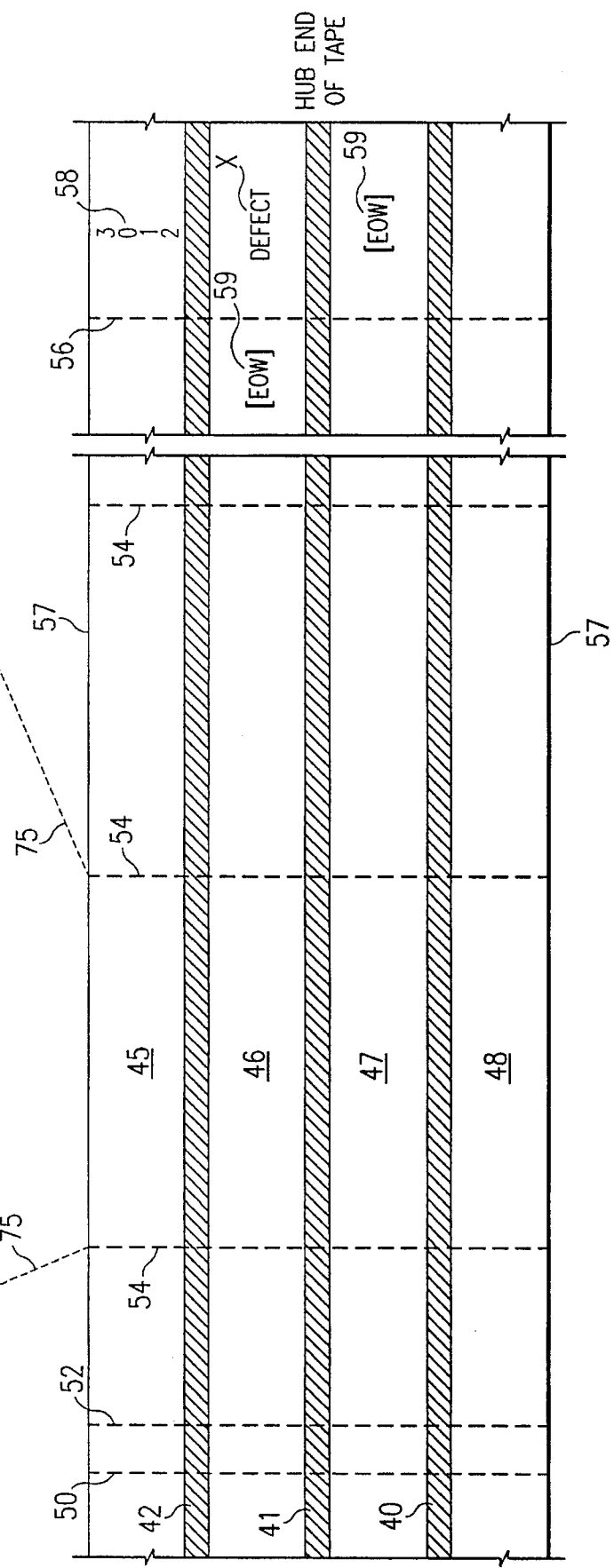
FIG. 2 is a simplified partial showing of a magnetic tape having a format employing the present invention.

Referring next to FIGS. 2 and 3, the tape track format, servo format, DBM and SARS storage on tape 21 and the like are described. Tape 21 includes triple longitudinally-extending laterally-spaced-apart redundant identical longitudinally-extending servo areas 40–42 for laterally relatively position tape 21 and head 27 in four relative positions. At a free end of tape 21 (to the left in FIG. 2), a drive to tape calibration area is disposed between dashed lines 50 and 52. This area contains signals (not described) that enable tape drive 10 to calibrate its operation to the particular characteristics of the loaded tape 21. The tape area between dashed line 52 and a hub end of tape 21 is available for recording. The later described track groups 0–3 respectively have a beginning of wrap (BOW) tape control block (not shown) longitudinally adjacent dashed line 52 and a end of wrap block (EOW) 59 at the hub end near line 56. Dashed lines 54 respectively indicate addressable logical partitions each of which is a collection of contiguous sectors that are indicated and addressed using tachometer 22. As will become apparent, such dashed lines can either denote such tachometer 22 indicated tape displacement locations for all data tracks or for only selected data tracks. In the latter regard, numeral 58 denotes four track groups 0–3 used in a constructed embodiment and as best seen in FIG. 3. Serial recording proceeds from track group 0 through track group 3, no limitation thereto intended. The dashed line 54 indicated displacement locations preferably relate to tracks only in the respective track groups 0–3. Track portions between longitudinally adjacent ones of the dashed lines 54 are partitions. Dashed line 56 indicates approaching the hub end of tape 21. In each of the track groups, line 56 may be at a different longitudinal position. For example, if a medium defect X is longitudinally adjacent the hub end of tape 21 affects data tracks in track groups 0 and 2 but not 1 and 3, then a end of wrap data block EOW 59 (later described) is recorded in groups 0 and 2 tracks for shortening the data track lengths while an identical end of wrap block EOW 59 is written in track groups 1 and 3 at dashed line 56. Detected media defects remote from either longitudinal end of tape 21 are identified by a pair of so-called servo defect blocks (SDB), tape control blocks, that respectively are immediately upstream and downstream from the detected defect for defining a limited portion of a group of data tracks in one of the track groups 0–3 that is not available for recording because servo areas 40–42 are affected by the medium defect.

First track group 0 is laterally displaced from longitudinal edges 57 respectively by tracks in track groups 3 and 1,2. Since track group 0 is a logical beginning of data recording, tape control information (DBM and SARS) is recorded in track group 0 in a so-called drive partition that exists between dashed lines 52 and a first dashed line 54. Such drive partition in track group 0 is only addressable by tape drive 10 and not by controller 11 nor other units 12. All other-units addressable partitions on tape 21 are arbitrarily numbered from 0 to a current maximum number of partitions. Each partition, whether a drive partition or an addressable partition, is a logical collection of contiguous sectors, each partition may have a different number of sectors. A sector (sometimes referred to as a segment) is a tachometer 22 determined length of tape and can be accessed by moving tape 21 and monitoring tachometer 22 generated count values (not shown). Any form of physical location addressing may be used, such as arbitrarily selected tachometer count values. First dashed line 54 does not apply to data tracks in track groups 1–3. Milligan et al in U.S. Pat. No. 4,393,883 shows generating physical reference values (PRV) that are usable to identify the sectors on tape 21.

Control information stored in the drive partition is useful to controller 11, other units 12 or tape drive 10 but such control information is addressable and readable only by peripheral drive 10. Tape drive 10 may supply such information to either controller or other units 12, as may be desired. The control information stored in the drive partition is that information primarily useful to tape drive 10 as it identifies physical locations on tape 21 of diverse control data elements useful for quickly locating data stored on tape 21, therefore it is referred to as storage medium physical access data. The usual prior art VTOC or TTOC may be stored in partition 0 for identifying to other units 12 the informational content of tape 21 including the logical data elements as partitions, logical volumes, files and the like. Control information shown in FIG. 2 identified by numerals 60–78, in the drive partition is not visible (addressable) outside of tape drive 10. The illustrated drive partition may consist of a plurality of partitions, for example, a DBM partition for storing all copies of DBM, a SARS partition for storing all copies of SARS and a MDI partition for storing all copies of MDI. All other partitions are addressable, explicitly or implicitly by other units 12. Implicit addressing is by other units 12 addressing files, virtual volumes and the like. Tape drive 10 has the usual load point controls for positioning magnetic tape and magnetic head 27 to first read the tracks in track group 0.

Figure 4:
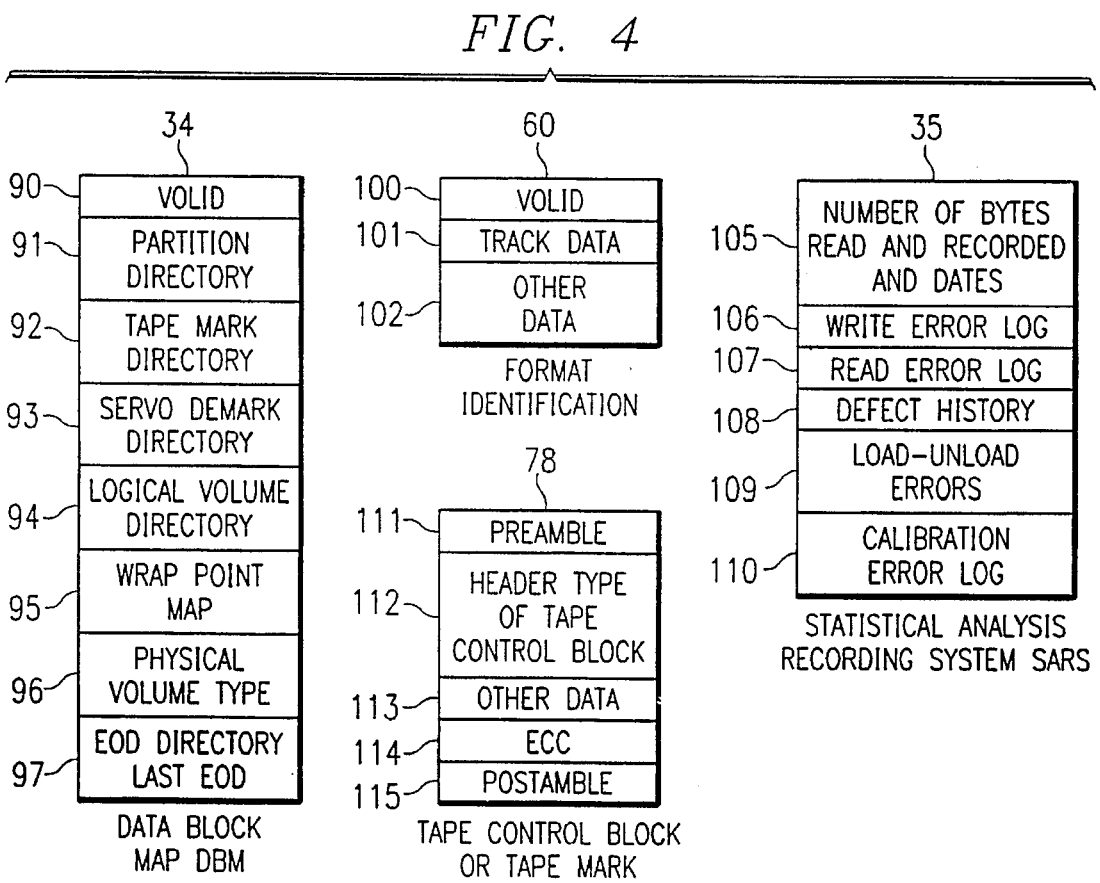
FIG. 4 is a simplified showing of data structures used to illustrate the present invention.

Control information in tape drive 10 created, updated and managed partition includes a format identification (FID) block 60 (FIG. 4). FID 60 indicates that tape 21 is formatted as shown. All other control information is stored in K copies, K is an integer preferably $2^J$ where J is a positive integer, such as 3. Each block of control information is separated by a usual interblock gap (IBG) 61. A first copy of the control information includes mount-demount indicator MDI block 63, copy 1 indicated by MDI 1, DBM 1 (copy 1 of K) and SARS 1 (copy 1 of K). All additional copies of the control information are represented by ellipsis 74. An end-of-data EOD tape control block 78 indicates the end of data in the tape drive accessed partition indicated by numeral 75. MDI 1 may be stored in the drive partition after SARS 1 69, i.e. between SARS 1 and EOD. Alternately, all MDI copies may be stored in one string of blocks, all DBM copies stored in a second string of blocks and all SARS copies stored in a third string of blocks. The sequence of storage in the drive partition is one of choice.

FIG. 3 diagrammatically illustrates obtaining a maximal spacing between adjacent data tracks in each track group 0–3. Numerals 81–89 respectively indicate track clusters 1–8, and remaining track clusters, each track cluster having one track from each track group 0–3. Laterally adjacent track clusters have tracks scanned in opposite scanning directions 79 and 80. Magnetic tape 21 moves in a direction to the track scanning direction by magnetic head 27. The "to hub" scanning direction is caused by magnetic tape 21 being reeled from cartridge spool 20 while the "from hub" scanning direction is caused by magnetic tape being reeled onto cartridge spool 20. Magnetic tape 21 is scanned in a serpentine sequence. While magnetic head 27 is at one lateral (index) position, one serpentine scan (also termed a track wrap) occurs. In scan direction 79 one track in each of the odd numbered clusters are scanned while in scan direction 80 one track in each of the even numbered track clusters are scanned. The arrows in the respective track clusters 81–89 (numbered as clusters 1–8 plus remaining clusters) indicate the tracks. Each vertical number sequence "2 0 1 3" in each of the track clusters respectively indicate the track group to which the respective data track belongs. The track number of the arrow indicated tracks in each of the clusters is determined by the following equations wherein K is the cluster number from 1–32:

Track number of track group 2 track=$(K * 4)-3$  (1)

Track number of track group 0 track=$(K * 4)-2$  (2)

Track number of track group 1 track=$(K * 4)-1$  (3)

Track number of track group 3 track=$(K * 4)$  (4)

In each data track area 45–48, in a constructed embodiment, all of the tracks are evenly spaced apart laterally, no limitation thereto intended. The concurrently accessed tracks of each track group are spaced apart by seven intervening tracks. For example, tracks 1 and 9, as determined by the equations above, are laterally separated by tracks 2 through 8. For having four groups of tracks, such lateral spacing is maximum for all tracks and is the same for all successively numbered tracks in each track group. Note that the tracks of track group 2 in the even numbered track clusters are not accessed concurrently to the track group 2 tracks in odd numbered clusters. Also, the four data track areas 45–48 (FIG. 2) have a like number of tracks (each data track area has eight track clusters) such that the servo track areas 40–42 have a maximum lateral spacing. Such maximum lateral spacing is an optimum spacing for reducing errors caused by magnetic tape defects. A pair of unrecorded longitudinally-extending guard bands 43 separate the data track areas from each of the servo track areas 40–42.

Numerals 54-A and 54-B respectively indicate different partition boundaries of a partition disposed adjacent the hub end of tape 21 and that spaces the EOW block 59 indicating end of wrap. Such partitions may also span BOW tape control blocks and extend between adjacent track groups. That is, a partition can begin in track group 0 and extend into track group 1. Also a partition can include the entirety of tape 21 recording area except for the drive partition. In scan direction 79 numeral 54-A indicates P's denoting location in each of the data tracks of track group 1 in an odd numbered cluster that is a partition leading boundary (first scanned in a forward direction of tape motion). Similarly, numeral 54-B indicates an end of such partition in track group 1 but occurring in even numbered track clusters in scan direction 80. Such partition boundaries contain no special marks, that is, such boundaries are addressed by tape displacement. Alternately, a partition-boundary-indicating tape control block may be used. In the former embodiment, data blocks, as in the prior art, are addressed by other units 12 using block ID's.

As used herein, the term forward direction means the direction of track scanning for writing data. Track scanning in a reverse direction is termed a backward direction. Tape 21 is transported between reels 20 and 25 in a reciprocating manner but the track scanning is in a forward direction or backward direction irrespective of actual tape direction of motion. The terms "upstream" and "downstream" defining an item on tape with respect to a current tape position to respectively mean that an item is scanned either before or after said current position in the forward direction of scanning.

FIG. 4 illustrates all of the data structures used herein. DBM 34, whether stored in RAM 33 or tape 21, has VOLID field 90 storing the volume ID or VOLID of the physical tape volume. The directories and maps in DBM 34 as described below include linked lists of a plurality of entries in the respective directories and maps. A pair of pointers point respectively to the beginning and end of each of the linked lists. Such lists can be singly or doubly linked. Tachometer count values in each directory indicate the respective tape displacement location in a forward direction of data track scanning. Tape lengths between successive tachometer counts are termed sectors. A partition is an addressable logical collection of contiguous sectors. Block ID's and other logical data indications may be included in any of the directories and maps. Partition directory 91 includes the forward direction tape displacement tachometer location of each partition along with a block ID identification of a first logical block in each partition. The partitions are enumerated in any numerical sequence, preferably from zero to a highest current numbered partition. The tape drive reserved partition between dashed lines 52–54 is not included in directory 91 as it is not addressable by other units 12. Both the sector and partition numerical sequences begin at the load point or beginning of track group 0, then proceed to the end of track group 0, thence to groups 1, 2 and 3 (in that order) such that the forward direction of scanning appears as one long tape medium, as indicated in FIG. 3.

Data tracks in even numbered track clusters in each track groups are scanned first, therefore have lower tachometer count values than data tracks in odd numbered track clusters. Changing the accessible length of data tracks by moving EOW block in front of a defect X (FIG. 2) does not change the tachometer tape displacement count as the defect is scanned over whether or not data are recorded in the track group affected by such defect.

Tape mark directory 92 indicates the sector number of each tape mark on tape 21. Tape marks in the prior art were special recorded patterns for defining data file boundaries on data-storing magnetic tapes. In the described embodiment, such tape marks still indicate data file boundaries but are recorded as a later described tape control block. The tape mark directory is useful in connection with determining data file limits on tape 21 for selecting a tape moving algorithm as shown in FIG. 9.

Servo demark directory 93 includes tachometer indications of locations of servo demark tape control blocks. Such demark tape control marks are link listed together in respective demarked media defect areas as later detailed.

Logical volume directory 94 indicates the partitions having logical volumes and the tachometer number indicating location of each such logical volume. Logical volumes are addressable by other units 12 as if such logical volume was a physical volume. Such logical volumes contain their own respective block ID sequence that is independent of the block ID sequence used in the physical tape volume not included in such logical volume. Directory 94 may also contain other data particularly relating to logical characteristics of such logical volume. Tape drive 10 writes an EOD tape control block in each partition for indicating end of data recording. An empty partition optionally has an EOD block at its beginning location. Such EOD block, even when in a logical volume that occupies one or more partitions, is included in directory 91.

Wrap point map 95 identifies the track hub end extremities of data tracks measured in the forward direction and the respective mid points of the data tracks. That is, map 95 identifies the tachometer count for each EOW block 59 (data track extremity near the hub) for all data tracks in even numbered track clusters respectively in each track group. Map 95 also includes identification of a plurality of other physcial reference points that are tachometer identified, such as track mid points, and the like.

Defining map 95 in another way, each physical reference point identification can also be deemed to include a quarter-point of each track group. Other track arrangements result in differing arrangements for the reference points. Also, if one terms a track group a wrap of one set of data tracks, then all tracks in a track group in even numbered track clusters are deemed to be a first half-wrap and all data tracks of the track group in the odd-numbered track clusters are a second half-wrap. Wrap point map 95 includes a so-called mid-point identification is the midpoint of each wrap. Field 96 indicates the type of physical volume, such as capacity, number of track groups, etc.

Directory 97 includes a linked list of EOD block sector locations logically listing the EOD's from tape load point to the end of track group 3. A pair of pointers respectively point to a first EOD and a last EOD. The last EOD enables a fast locate to the end of recorded data on tape 21.

Format identification block 60 (ignoring the usual tape clock synchronization field, etc) includes the tape 21 volume identification VOLID 100, track data 100 and other format identifying data 102. The track data 101 include number of data tracks, track cluster and group definitions, sector length or extent definitions and the like. Other data 102 may include logical definitions, such as logical volume restrictions, volume affinity parameter data (i.e. relationships to other volumes) and the like.

Tape control block 78 includes the usual clock and byte synchronization signals 111. Header 112 may include an identification of type of tape control block, i.e. tape mark, EOD, BOW, EOW, servo defect block (SDB) and the like. Header 112 also may include a block ID of the tape control block. The sequence of data block "block ID's" is a separate sequence than that used for tape control blocks. Other data beyond this description may be included in field 113. Error detecting and correcting ECC field 114 contains suitable error redundancy data. If reading is permitted in a track scan direction opposite to the forward scanning direction, then postamble 115, a mirror image of preamble 111, ends tape control block 78. If reading is permitted only in the forward direction, then postamble 115 is replaced by a terminating or trailer of any configuration.

SARS 35, by way of example, includes field 105 that indicates the number of bytes of data read and recorded from and to tape 21 along with suitable time stamps (dates). All write errors are logged in field 106. Similarly, read errors (even ECC corrected read errors) are logged in field 107. Field 108 stores a history and sector locations of detected media defects. Field 101 stores a history of calibration errors resulting from calibrating tape drive 10 using area between dashed lines 50 and 52. Other error and statistical data are included as desired.

Figure 5:
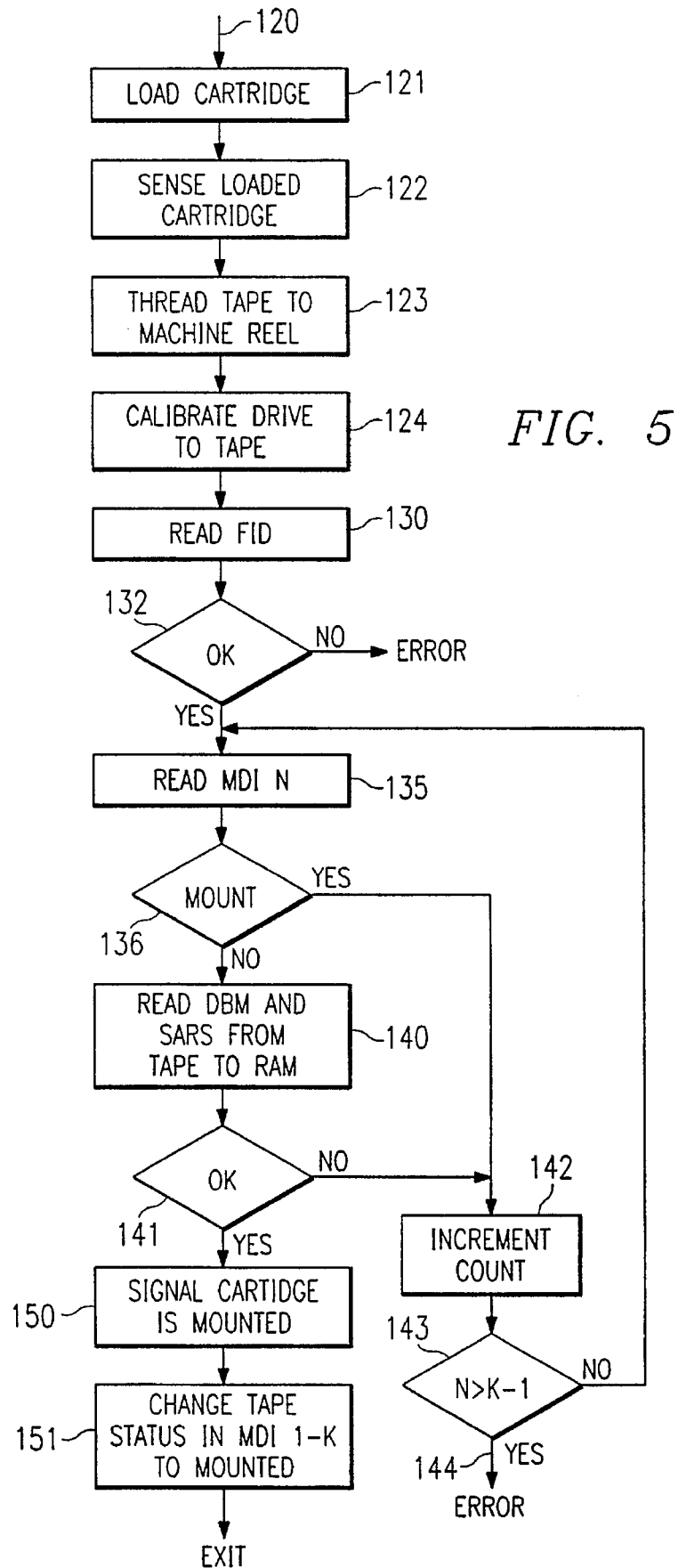
FIG. 5 is a simplified flow diagram relating to mounting a FIG. 2 illustrated tape for illustrating peripheral drive operations employing the present invention

FIG. 5 shows a tape drive 10 mounting sequence for tape 21 in cartridge 17. At arrow 120 a cartridge loading sequence is initiated by control 30. Such sequence may include fetching, indicated by double-headed dashed-line arrow 15, a cartridge from library 14 and transporting it to tape drive 10. Step 121 loads cartridge 17 into a play position of tape drive 10 as diagrammatically shown in FIG. 1. In step 122, sensor 31 senses and indicates that cartridge 17 is in the FIG. 1 play position and supplies the indication to control 30. Control 30, in step 123, actuates tape spools 20, 15 to rotate and a known tape threading mechanism (not shown) to thread tape 21 past head 27 onto machine spool 25. In those cartridges in which both spools are in the cartridge, the threading step is omitted. Step 124 (control 30 initiated) calibrates the tape drive 10 servo control (not shown) and read back circuits (not shown) to the tape 21 recording characteristics and the locations of servo track areas 40–42 in the FIG. 2 illustrated tape 21. Step 130 reads FID 60 from tape 21 to determine that tape 21 has a drive partition having MDI, DBM and SARS as shown in FIG. 2. If step 132 shows that FID 60 was successfully read, then steps 135 et seq are performed. If FID 60 was not successfully read, then an error condition is signaled requiring an error recovery that is beyond the present description.

Steps 135–144 constitute an operation loop for finding one valid and readable DBM and SARS. Step 135 reads MDI N (N=1 in the first pass). Step 136 determines the status indicated in MDI N as being either demounted (correct status) or mounted (error status). If step finds MDI N indicating a demounted status, then step 140 read DBM N and SARS N into RAM 33 respectively in areas 34 and 35. Step 141 determines whether both DBM N and SARS N have been successfully read. If YES, then step 150 causes tape drive 10 to indicate to controller 11, hence other units 12, that the requested volume mount has been completed. Step 151 then accesses all copies of MDI 1–K, K is a positive integer, for rewriting each MDI to reflect status of tape 21 as being mounted.

Returning to decisions step 141, if the read of either DBM or SARS fails, then the NO exit is taken to step 142 for incrementing the loop count. Step 143 compares the increment count with the maximum number K−1 of loop traversals. If the maximum number is exceeded, then an error 144 is signaled to other units 12. If the loop count is not greater than K−1, then the loop is repeated by executing steps 135–143 as just described.

Next, returning to step 136, if MDI N indicates the mount status, then error exit (YES) is used. The error is logged in RAM 33 for later use as may be desired. Then, steps 142 et seq are performed as previously described.

The described mounting procedure requires but one of the K MDI's to indicate demounted status. For purposes of reliability, availability and serviceability, it may be desired that M of K MDI's have a demounted status. M is an integer 0 or greater and not greater than K. Note that inability to read a given copy of MDI, DBM or SARS does not give rise to the last-stated alternate procedures. In any event, the separate SARS copy 35 is updated to reflect any of the described error conditions.

FIG. 6 shows a procedure usable to keep the DBM and SARS separate copies in RAM 33 current. Note that the copies of DBM and SARS on tape 21 are not updated until demount time shown in FIG. 10. Step 180 receives a command in tape drive 10 from other units 12 relating to format on tape 21. Such commands include a write command that adds data to existing data resulting in moving any EOD tape control block, creating a new partition, creating a logical volume and the like. As may be required by the received command, step 181 writes data on tape 21. Step 182 updates the separate DBM copy 34 in RAM 33. Step 186 updates the separate copy 35 of SARS in RAM 33. The SARS copy 35 may also be updated independently of command execution if either controller 11 or tape drive 10 detect an error that is a subject of SARS. Step 187 is an optional step for keeping the tape 21 DBM and SARS copies as current as possible. If tape drive 10 is not busy, or not busy for some predetermined elapsed time, and tape 21 is positioned at head 27 only a maximum predetermined length from logical load point in track group 0, then the tape 21 copies of DBM and SARS may be updated. It should be noted that all or none of the tape copies should be updated at a given instance—all tape copies of DBM and SARS should be identical.

FIG. 7 shows a simplified version of a high speed locate to a predetermined sector. Arrow 190 indicates an initiation of the high speed block locate. Step 191 moves the tape to a wrap midpoint (DBM copy 35 field 95 yields the sector number for any desired wrap midpoint). FIG. 7 assumes that head 27 has been indexed to read tracks from an appropriate track group as determined from partition directory 91, for example. After head 27 reaches a target midpoint, then step 192 move tape 21 to a so-called landing area this is just "upstream" (in a forward direction would be scanned before a target sector, logical volume etc) from a target position. The step 192 may be either a high speed movement (head 27 does not sense tape 21 recorded data) controlled using tachometer 22 generated count values or a slow speed movement (head 27 reads the tape 21 recorded data) for finding a block ID or other machine sensible indicium.

FIG. 8 illustrates generating a high speed movement to an end of all data recorded on tape 21. This operation is caused by a request, represented by arrow 200, from other units 12 to add a new file or other data to tape 21. Step 201 reads the EOD directory 97 for identifying the sector or physical location of the last EOD in the directory. Step 202 indexes head 27 to the track group in which the last EOD has been recorded. Then a high speed locate to the sector for the last EOD indicated in directory 97 is performed, such as set forth with respect to FIG. 7.

FIG. 9 illustrates using tape mark directory 92 with respect to files recorded on tape 21. Other uses may be easily envisioned. A request received from other units 12 initiates a tape 21 positioning operation. Step 211 reads tape mark (TM) directory 92 for finding the tape mark that defines a trailing extremity of the request identified file. Step 212 evaluates the time of head and tape positioning motions required to respond to the received request. Step 214 determines whether or not a distance D of tape motion (after head indexing) is greater than a motion threshold T for effecting a high speed (non reading) tape motion. Is yes, then step 215 effects a fast or high speed locate to the upstream file limit indicated by a first one of the tape mark blocks. Otherwise, step 218 effects a slow speed access to the identified tape mark.

FIG. 10 illustrates demounting tape 21 while leaving tape 21 loaded, but not mounted, in tape drive 10. Step 160 receives an other unit request in tape drive 10 to demount tape 21. Such a demount request may be explicit for tape 21 or implicit by requesting a demount of a logical volume on tape 21. Step 161 determines whether tape 21 is in fact mounted, i.e. the tape copies of MDI are all indicating mounted status. If not mounted, even though loaded in tape drive 10, line 162 indicates an error condition that is reported to other units 12. Since this error is not related to tape 21, no copy of SARS needs to be updated.

Assuming that tape 21 is mounted, then step 164 moves tape 21 to its load point (rewind tape). Tape drive 10 builds a MDI in RAM 33 that shows tape 21 is demounted. Then operation loop 165–168 copies the separate copies of DBM 34 and SARS 35 to tape 21. The MDI status in all tape copies of MDI are changed to demount. Loop 165–168 includes first copying the RAM copy of DBM 1 and SARS 1 to tape 21 (see FIG. 2) step 166 increment loop counter (not shown). Step 167 compares current loop count N with K. If N is not greater than K, then step 168 records MDI 1. For reducing tape 21 motion, MDI 1 may be positioned on tape 21 just after SARS 1 such that all blocks DBM 1, SARS 1 and MDI 1 can be recording in one pass. In any event, loop 165–168 is repeated K times. Step 174 resets the loop counter to one in preparation for a next demount. Step 175 writes an new EOD 78. Since data may have been added to DBM and SARS, the new EOD 78 is moved toward a downstream end of the drive partition. Tape drive 10 then signals other units 12, via controller 11, that the requested volume (whether logical or tape 21) has been demounted. Cartridge 17 with tape 21 remain loaded in tape drive 10. A reason for leaving tape 21 loaded is that additional data processing activity may occur with respect thereto. Numeral 176 indicates intervening data processing activity. Step 178, executed in tape drive 10, determines that a different cartridge is to be loaded and probably mounted in tape drive 10. Step 179 unloads cartridge 17 for returning it to library 14 and loads and mounts a different cartridge (not shown) in tape drive 10.

FIG. 11 illustrates generating a drive partition and a partition as a first addressable data-storing partition on tape 21. A scratch tape is loaded into drive 10. Drive 10 attempting to read the tape determines that the loaded tape is scratch (not formatted). It is noted that in many data processing systems, an attaching host will command loading and mounting a scratch tape such that tape drive 10 is expecting the scratch tape. In any event, step 230 verifies that the loaded tape is a scratch tape. It is preferred that the scratch tape has factory recorded servo areas 40–42 and calibration area between dashed lines 50 and 52 (FIG. 2). Control 30 then can format the scratch tape by creating in memory 33 data for a drive partition that is not addressable by any attaching unit 11 or 12. Such data includes the directory structures hereinabove described. Such creation first includes recording patterns in calibrating area developing and recording the BOW and EOW tape control marks in the respective track groups. Writing BOW and EOW can be deferred until data written to tape 21 reaches the respective beginning and ends of the data tracks (wrap ends). The physical locations of such tape control marks are entered into the wrap point map 95 being built in memory 33 (DBM 34). A SARS 35 is also built in memory 33. Upon completing DBM 34 and SARS 35 plus a mount-demount tape control block indicating that the loaded scratch tape is not mounted, peripheral drive 10 is ready to complete the formatting. Such formatting is completed by copying and recording all of the data onto the scratch tape beginning at a logical load point in track group 0. Upon completing formatting, the loaded tape has MDI indicating the tape is not mounted and the only recording thereon are the above-mentioned tape control blocks and the drive partition 60–78. Drive partition 60–78 is not assigned any address nor sequence number for ensuring that it is addressable only by moving the formatted tape to load point, then tape drive 10 accessing the data in such drive partition. All other partitions are assigned a number (address) beginning with zero that make such partitions addressable. From step 231 other operations are performed leaving the just-formatted tape loaded in tape drive 10 but not mounted.

Tape drive 10, in step 232 receiving a request from other units 12 to allocate space on a magnetic tape proceeds in step 233 to mount the just-formatted tape as described with respect to FIG. 4. First, tape drive 10 in step 236 identifies the physical location of the last EOD. Since the just-formatted tape has only the drive partition, EOD directory 97 indicates end of data in the just-formatted tape to the drive partition. Tape drive 10 in step 237 then generates a first addressable partition as partition 0 in track group 0 beginning at a trailing end of the drive partition. The length of partition 0 depends on requested data capacity. Tape drive 10 then selects two physical locations for identifying partition 0. Optionally, an EOD tape control mark is recorded at the beginning physical location of partition 0 is indicate that the partition is empty. Then, step 238 records the definition of partition 0 in partition directory 91 of DBM 34. Partition 0 is now ready to receive and store data. Other partitions are similarly created, each new partition being assigned a next higher sequence number.

Since tachometer 22 defines tape segments, allocation of partition 0 can be by selecting a number of tape segments beginning at the end of the drive partition. Adding the number of added segments to the physical location indicating the end of the drive partition results in a tachometer value indicating the physical location of the end of partition 0.

While the invention has been particularly shown and described with reference to preferred embodiments thereof, it will be understood by those skilled in the art that various changes in form and details may be made therein without departing from the spirit and scope of the invention.

What is claimed is:

1. A method of recording data onto and reading data from a data storage medium wherein a drive supports and provides access to the storage medium and a host means sends and receives data to and from the drive for recording on and reading from the storage medium, said storage medium and a head being relatively movably mounted in the drive for accessing portions of the record storage medium for recording data onto and reading data from the storage medium, including the steps:

establishing a first data storage area on the storage medium, making said first data storage area addressable by said drive and not addressable by said host means such that the host cannot write data onto nor read data from the storage medium by addressing said storage medium;

establishing a plurality of second data storage areas on the storage medium, making all of said second data storage areas accessible to said host by said host addressing said second data storage areas;

in said first data storage area establishing a plurality of directories of predetermined physical access parameters of said storage medium, in each of said established directories storing first identifications of data elements stored in the data storage medium and with each of said first identifications storing respective second identifications of physical locations on said storage medium of said data elements; and in said second data storage areas storing predetermined ones of said first identifications of said logical data elements along with storing said logical data elements;

in said drive, receiving a request from the host means for accessing one logical data element in one of said second data storage areas;

in said drive, before accessing said one of said second data storage areas, transferring a copy of a predetermined portion of one of said directories from the first data storage area to a memory external of the storage medium, then accessing a predetermined one of said directories in said memory for retrieving a predetermined one of said physical locations indicated in said one directory, then in said drive relatively moving said head and said storage medium to a said indicated physical location;

in said drive, from said indicated physical location relatively moving said head and storage medium in a predetermined direction for accessing said one logical data element in said one of said second data storage areas for exchanging data between the one data storage area and said drive without further reference to any of said physical location data;

recording in each of said second data storage areas that stores data an end of data mark that indicates an end of the stored data in the respective ones of said second data storage areas;

in the drive, recording in said first data storage area an end of data directory having an identification of all of said recorded end of data marks including respective indications for said recorded end of data marks indicating respective physical locations on the storage medium at which said recorded end of data marks are located; and sorting in said end of data directory for listing all of said recorded end of data marks in an order in which said recorded end of data marks appear in said second data storage areas such that one of said end of data marks indicates an end of data for all data stored in all said second data storage areas.

2. The method set forth in claim 1, including the steps:

receiving in said drive from said host means a volume table of contents for said storage medium;

in said host means, including in said volume table of contents a plurality of indications respectively identifying predetermined ones of said second data storage areas and identifications of data contents of said identified predetermined ones of said second data storage areas; and storing said received volume table of contents in a predetermined one or said predetermined ones of said second data storage areas.

3. The method set forth in claim 1, including the steps:

selecting said storage medium to be an elongated magnetic tape having a plurality of data storage track scannable by said head means by relatively moving said tape and said head means;

making said tracks extending longitudinally of said tape; and establishing a load point at which said head means is first relatively positioned for accessing said first data storage area before accessing any of said second data storage areas.

4. The method set forth in claim 3, including the steps:

in said magnetic tape, establishing a plurality of track groups, establishing in each said track group a plurality of first and second clusters of data tracks, establishing in each one of said first clusters a forward direction of scanning in a first relative direction of tape and head means relative motion, establishing in each one of said second clusters said forward direction of scanning in a second direction of relative motion of said magnetic tape and said head means that is opposite to said first direction of said magnetic tape and said head means relative motion;

establishing in each said track cluster a predetermined number of physical reference points at respective predetermined longitudinal locations on the tape;

in said drive, identifying and indicating each said longitudinal reference points of said data tracks in each said track cluster; and establishing in said first data storage area a map of said reference points and recording in said map a predetermined identification of each respective location of all of said identified reference points.

5. The method set forth in claim 4, including the steps:

in said magnetic tape, determining and indicating for each of said second data storage areas physical magnetic tape displacement locations of a beginning and end of each one of said second data storage areas; and in said first data storage area creating a partition directory, recording in said partition directory an identification of all said second data storage areas and said indicated physical magnetic tape displacement locations of the beginning and end of each said second data storage areas.

6. The method set forth in claim 5, including the steps:

receiving in said drive a request from said host means to access a predetermined one of said second data storage areas;

in said drive, determining and indicating a current relative position of said predetermined one of second data storage areas to said head means, determining and indicating a physical location of said predetermined one of said second data storage areas;

in said drive, determining and indicating a predetermined one of said reference points in a predetermined one of said track clusters that has a relative predetermined displacement from said predetermined one of said second data storage areas;

relatively moving said magnetic tape and said head means to said predetermined one of said reference points; and from said predetermined one of said reference points relatively moving said magnetic tape and said head means for enabling the head means to scan said tracks in said predetermined one of said track clusters in said forward direction to said predetermined one of said second data storage areas.

7. The method set forth in claim 6, including the steps:

recording data in said predetermined one of said second data storage areas;

in said drive, after recording data in said predetermined one of said second data storage areas, recording an end of data mark at a given physical location in said predetermined one of said second data storage areas; and in said first data storage area, recording said given physical location as an end of data in said predetermined one of said second data storage areas.

8. The method set forth in claim 3, including the steps:

establishing a memory in the drive;

in the drive, copying data from said first data storage area to said memory; and recording a mark in the first data storage area that indicates the data stored in said first data storage area is invalid.

9. The method set forth in claim 8, including the steps:

making said magnetic tape a removable medium on a supply reel and providing in said drive a magnetic tape receiver and means for transporting said tape between said machine reel and said supply reel;

in said drive, sensing and indicating that said magnetic tape is in said receiver;

in said drive, indicating that said magnetic tape in said receiver is not mounted in the drive; and after said copying data from said first data storage area to said memory, indicating that said magnetic tape is mounted in said drive.

10. The method set forth in claim 9, including the steps:

receiving in said drive a request from said host means to demount said magnetic tape from said drive;

copying all of the data stored in said memory to said first data storage area;

recording a second mark in said first data storage area for indicating that said magnetic tape is demounted and that data stored in said first data storage area is valid;

leaving said magnetic tape in said drive; and indicating to said host means that said magnetic tape is demounted from said drive.

11. A method of recording data onto and reading data from a data storage medium wherein a drive supports and provides access to the storage medium and a host means sends and receives data to and from the drive for recording on as recorded data and reading said recorded data from the storage medium, said storage medium and a head being relatively movably mounted in the drive for accessing portions of the record storage medium for recording data onto and reading said recorded data from the storage medium, including the steps:

establishing a first data storage area on the storage medium, making said first data storage area addressable by said drive and not addressable by said host such that the host cannot write data onto nor read data from the storage medium by addressing said storage medium;

establishing a plurality of second data storage areas on the storage medium, making all of said second data storage areas accessible to said host by said host addressing said second data storage areas;

in said first data storage area establishing a plurality of directories of predetermined physical access parameters of said storage medium, in each of said established directories storing first identifications of data elements stored in the data storage medium and with each of said first identifications storing respective second identifications of physical locations on said storage medium of said data elements; and in said second data storage areas storing predetermined ones of said first identifications of said logical data elements along with storing said logical data elements;

in said drive, receiving a request from the host means for accessing one logical data element in one of said second data storage areas;

in said drive, before accessing said one of said second data storage areas, transferring a copy of a predetermined portion of one of said directories from the first data storage area to a memory external of the storage medium, then accessing a predetermined one of said directories in said memory for retrieving a predetermined one of said physical locations indicated in said one directory, then in said drive relatively moving said head and said storage medium to a said indicated physical location;

in said drive, from said indicated physical location relatively moving said head and storage medium in a predetermined direction for accessing said one logical data element in said one of said second data storage areas for exchanging data between the one data storage area and said drive without further reference to any of said physical location data;

in said drive, generating a first plurality of diverse types of medium control blocks;

on said recording medium, recording, interleaved with said recorded data, a second plurality of said medium control blocks at predetermined physical locations in said storage medium; and in said first data storage area recording a different one of said plurality of directories for respectively identifying each said type of medium control blocks including indicating said predetermined physical locations in the respective directories for each said medium control block identified therein.

12. The method set forth in claim 11, including the steps:

in said drive, determining and indicating a plurality of physical relative locations of said magnetic tape relative to said head means;

in said second data storage areas establishing partitions, each of said partitions comprising at least one of said second data storage areas, identifying each one of said partition by first respective ones of said physical relative locations; and in said first data storage area, establishing a separate directory for said partitions including identification of said first respective physical locations and a separate directory for each type of said diverse medium control marks and including identifications of said second respective physical locations for each of said medium control marks.

13. The method set forth in claim 12, including the steps:

in the first data storage area, recording a mount one of said medium control blocks including recording said mark in said mount one of said medium control blocks for indicating that said magnetic tape is mounted in said drive;

in the drive, recording into said first data storage area a copy of said data stored in said memory; and after recording a copy of said data stored in said memory into said first data storage area, in the drive, creating a unmount one of said medium control blocks including an indication that said tape is not mounted and that said data stored in said first data storage area is valid, then recording said unmount one of said tape control blocks in said first data storage area for obliterating said mount one of said medium control blocks.

14. The method set forth in claim 13, including the steps;

in the drive, while recording and reading data on and from said magnetic tape, detecting and indicating predetermined errors;

in the drive, creating a an error one of said medium control blocks, then storing said error one of said medium control blocks in said memory.

15. The method set forth in claim 11, including the steps:

making first ones of said medium control blocks end of data blocks;

after recording data in each said first and second addressable data areas, recording one of said end of data blocks;

in the drive, immediately after recording each of said end of data blocks, detecting and indicating a physical location of each said end of data block; and making one of said directories for identifying all of said end of data blocks and said detected and indicated physical location of each said end of data blocks, link listing said identifications in said one directory in order of said detected and indicated physical locations beginning with an end of data block in said first data storage area.

16. The method set forth in claim 12, including the steps:

making first ones of said tape control blocks end of data blocks;

making second ones of said tape control blocks tape marks for indicating longitudinal extremities of data files recorded on the tape;

after recording in each said first and second addressable data areas recording one of said end of data blocks;

in the drive, immediately after recording each of said end of data blocks, detecting and indicating a physical location of each said end of data block;

before and after recording predetermined data in one of said partitions recording a tape mark one of said tape control blocks and detecting and indicating a tape mark physical location of said recorded tape mark tape control block;

making a first said directories for identifying all of said end of data blocks and said detected and indicated physical location of each said end of data blocks, link listing said identifications in said one directory in order of said detected and indicated physical locations beginning with an end of data block in said first data storage area;

making a second of said directories for identifying all of said tape mark tape control blocks and said detected and indicated tape mark physical location of each said tape mark tape control blocks, link listing said identifications in said second directory in order of said detected and indicated tape mark physical locations beginning with an end of data block in said first data storage area;

in said tape drive, reading one of said first or second directories for identifying a predetermined one of said identified tape control blocks and its associated physical location;

then relatively moving said head means and said tape to an out of contact relationship at a first relative speed from a current relative position to said associated physical location; and then relatively moving said head means and said tape in a transducing relation.

17. A method of recording data onto as recorded data and reading said recorded data from a data storage medium wherein a drive supports and provides access to the storage medium and a host means sends and receives data to and from the drive for recording on and reading said recorded data from the storage medium, said storage medium and a head being relatively movably mounted in the drive for accessing portions of the record storage medium for recording data onto and reading said recorded data from the storage medium, including the steps;

establishing a first data storage area on the storage medium, making said first data storage area addressable by said drive and not addressable by said host such that the host cannot write data onto nor read data from the storage medium by addressing said storage medium;

establishing a plurality of second data storage areas on the storage medium, making all of said second data storage areas accessible to said host by said host addressing said second data storage areas;

in said first data storage area establishing a plurality of directories of predetermined physical access parameters of said storage medium, in each of said established directories storing first identifications of data elements stored in the data storage medium and with each of said first identifications storing respective second identifications of physical locations on said storage medium of said data elements; and in said second data storage areas storing predetermined ones of said first identifications of said logical data elements along with storing said logical data elements;

in said drive, receiving a request from the host means for accessing one logical data element in one of said second data storage areas;

in said drive, before accessing said one of said second data storage areas, transferring a copy of a predetermined portion of one of said directories from the first data storage area to a memory external of the storage medium, then accessing a predetermined one of said directories in said memory for retrieving a predetermined one of said physical locations indicated in said one directory, then in said drive relatively moving said head and said storage medium to a said indicated physical location;

in said drive, from said indicated physical location relatively moving said head and storage medium in a predetermined direction for accessing said one logical data element in said one of said second data storage areas for exchanging data between the one data storage area and said drive without further reference to any of said physical location data;

recording in each of said second data storage areas that stores data an end of data mark that indicates an end of the stored data in the respective ones of said second data storage areas;

in the drive, recording in said first data storage area an end of data directory having an identification of all of said recorded end of data marks including respective indications for said recorded end of data marks indicating respective physical locations on the storage medium at which said recorded end of data marks are located;

sorting in said end of data directory for listing all of said recorded end of data marks in an order in which said recorded end of data marks appear in said second data storage areas such that one of said end of data marks indicates an end of data for all data stored in all said second data storage areas;

selecting said storage medium to be an elongated magnetic tape having a plurality of data storage track scannable by said head means by relatively moving said tape and said head means;

establishing a load point at which said head means is first relatively positioned for accessing said first data storage area before accessing any of said second data storage areas;

in said magnetic tape, establishing a plurality of track groups, establishing in each said track group first and second clusters of data tracks, establishing in each said first cluster of data tracks a forward direction of scanning in a first relative direction of tape and head means motion, establishing in each said second cluster of data tracks said forward direction of scanning in a second direction of relative direction of tape and head means motion that is opposite to said first relative direction of tape and head means motion;

establishing in each said track cluster a predetermined number of physical reference points at respective predetermined longitudinal locations on the tape;

in said drive, identifying and indicating each said longitudinal reference points of said data tracks in each said track cluster; and establishing in said first data storage area a map of said reference points and recording in said map a predetermined identification of each respective location of all of said identified reference points;

in said first data storage area, recording a first plurality of copies of each said directories and said mount tape control block;

while recording said first plurality of copies, arranging said directory copies and said mount tape control copies into a predetermined physical relationship such that respective ones of said mount tape control copies are logically associated with respective ones of said directory copies;

in the drive, after recording said first plurality of copies, reading one of said copies of each said logically associated mount tape control blocks and directories and storing the read copy into said memory; and after said reading step, in said first data storage area, replacing all of said unmount tape control blocks with a first plurality of said unmount tape control blocks.

18. A method of recording data onto and reading data from a data storage medium wherein a drive supports and provides access to the storage medium and a host means sends and receives data to and from the drive for recording on and reading from the storage medium, said storage medium and a head being relatively movably mounted in the drive for accessing portions of the record storage medium for recording data onto and reading data from the storage medium, including the steps:

establishing a directory having first directory contents in a first portion of said storage medium that indicates physical locations of data blocks stored in said storage medium;

indicating in a first partition that said storage medium is not mounted to said drive;

reading a copy of said first directory contents from said first partition into a memory in said drive;

then changing said indication in said first partition that said storage medium is mounted in said drive and that said directory is not a valid copy of the first directory contents in said drive, generating a first plurality of diverse types of medium control blocks;

recording data onto the record medium as recorded data;

in said recording medium, interleaving and recording a second plurality of said medium control blocks among said recorded data at respective predetermined physical locations in said storage medium; and in said first portion recording a second directory for respectively identifying each said type of medium control blocks including indicating said predetermined physical locations in the second directory for each said medium control block identified therein.

19. The method set forth in claim 18, including the steps:

selecting said storage medium to be an elongated magnetic tape having a plurality of longitudinally-extending data storage tracks scannable by said head means by relatively moving said tape and said head means;

establishing a load point at which said head means is first relatively positioned for accessing said first portion before accessing any of said second data storage areas;

in said magnetic tape, establishing a plurality or track groups, establishing in each said track group first and second clusters of said longitudinally-extending data storage tracks, establishing in each said first cluster of data tracks a forward direction of scanning in a first relative direction of tape and head means motion, establishing in each said second cluster of data tracks said forward direction of scanning in a second direction of relative direction of tape and head means motion that is opposite to said first relative direction of tape and head means motion;

establishing in each said track cluster a predetermined number of longitudinal physical reference points at respective physical longitudinal positions in said each track cluster;

in said drive, identifying and indicating each said longitudinal reference point of said data tracks for each said track cluster;

establishing in said first portion a map of said track reference points and recording in said map all of said identified reference points;

in said tape, establishing a plurality of addressable partitions, detecting and indicating for each said addressable partition a physical location in one of said track clusters of a beginning end of each said partition; and in said first portion creating a partition directory, recording in said partition directory an identification of all said established partitions and said indicated respective physical magnetic tape displacement locations of the beginning each said partitions.

20. Apparatus for recording data onto and reading data from an elongated magnetic tape data storage medium, said data storage medium having a plurality of elongated data-storing tracks, a drive supporting and providing access to the data storage medium, host means sending and receiving data to and from the drive for recording data on as recorded data and reading said recorded data from the data storage medium, head means being relatively movably mounted in the drive for relative movements with respect to said data storage medium for accessing said elongated data-storing tracks for relatively scanning said tracks of the data storage medium for recording said data onto and reacting said recorded data from said data-storing tracks, including in combination:

tachometer means operatively connected to said data storage means for metering relative movements of said data storage means and said head means for indicating relative successive physical positions of said head means and said data storage medium;

first partition means connected to said tachometer means for establishing a first partition on the storage medium and for designating said first partition a drive partition for making said first partition addressable only by said drive;

second partition means connected to said tachometer means for establishing a plurality of second partitions on the data storage medium; indicating a respective one of said relative physical positions as a beginning of said partitions, address means in said second partition means for assigning addresses to each of said second partitions for enabling host and drive addressable access to said second partitions;

medium map means connected to said first and second partition means for establishing and maintaining in said first partition a plurality of directories of predetermined physical access parameters of said storage medium including storing first identifications of data elements stored in the partitions of the data storage medium and with each of said first identifications storing respective indications of said relative physical locations on said storage medium;

said data storage medium having a plurality of track groups, each said track group having a plurality of first and second track clusters, said data-storing tracks in each one of said first track cluster having a forward direction of scanning in a first relative direction of tape and head means movement, data-storing tracks in each one of said second track clusters having said forward direction of scanning in a second direction of relative direction of tape and head means motion that is opposite to said first relative direction of tape and head means motion;

each said track cluster having a predetermined plurality of longitudinal-position-indicting indicating reference points respectively at predetermined longitudinal locations in said data storage medium;

said tachometer means including point means for identifying a physical location of each said reference points;

said directory means connected to said point means for storing a predetermined indication of all of said identified reference points in one of said directories;

medium mark means in said drive for generating and reading a plurality of diverse types of medium marks, mark recording means in said medium mark means for recording diverse ones of said medium marks on said data-storing tracks in said track clusters, respectively, interleaved with said recorded data;

cluster means in said medium mark means for recording beginning and ending wrap medium marks for indicating respectively a beginning and an end of each of said clusters;

end of data means in said medium mark means for recording an end of data medium mark in each of said partitions that are storing a portion of said recorded data and indicating a physical location of each of said end of data medium marks; and directory means connected to said end of data means for sorting said end of data medium marks in accordance with said physical location indication of each said end of data medium mark for created a sorted list of said end of data medium marks for indicating a predetermined one of said end of data medium marks as indicating an end of data for said data storage medium.

21. Apparatus set forth in claim 20, further including:

mount control means connected to the storage medium for detecting and indicating presence of said storage medium in the drive;

a memory;

directory means connected to the memory and to the data storage medium for reading data from said first portion into said memory;

said mount control means having status means connected to said directory means and to said data storage medium for responding to said directory means copying said data from said first portion to said memory for recording in said drive partition an indication that said data storage medium is mounted into said drive and that said memory copy of said directories is an only valid copy of said directories.

22. Apparatus set forth in claim 20, further including;

partition accessing means connected to said one directory for relatively moving said head means and said data storage medium in a non-contact high speed movement to a predetermined one of said reference points and then relatively moving said head means and said data storage medium in a transducing relationship from said predetermined one of said reference points in said forward direction to a given predetermined one of said partitions for accessing said given predetermined one of said partitions.

23. Apparatus set forth in claim 22, further including:

demount means connected to the data storage medium, to said memory and to said directory means for actuating the directory means to copy said directories from said memory to said drive partition and connected to the magnetic tape to record in said drive partition an indication that said magnetic tape is demounted from the drive and that said copied directories in said drive partition are an only valid copy of said copied directories.

24. The apparatus set forth in claim 20, including in combination:

said medium map means having given means for recording a first plurality of copies of each said directories and said mount tape control block;

sort means in said medium map means while said given means is recording said first plurality of copies, arranging said first plurality of said directory into a predetermined physical relationship in said first partition.

* * * * *